July 16, 1968  W. A. SANZENBACHER  3,392,837
WATER-CONDITIONING UNIT
Filed Oct. 13, 1965  2 Sheets-Sheet 1

INVENTOR
WILLIAM A. SANZENBACHER
BY Lowry & Rinehart
ATTORNEYS

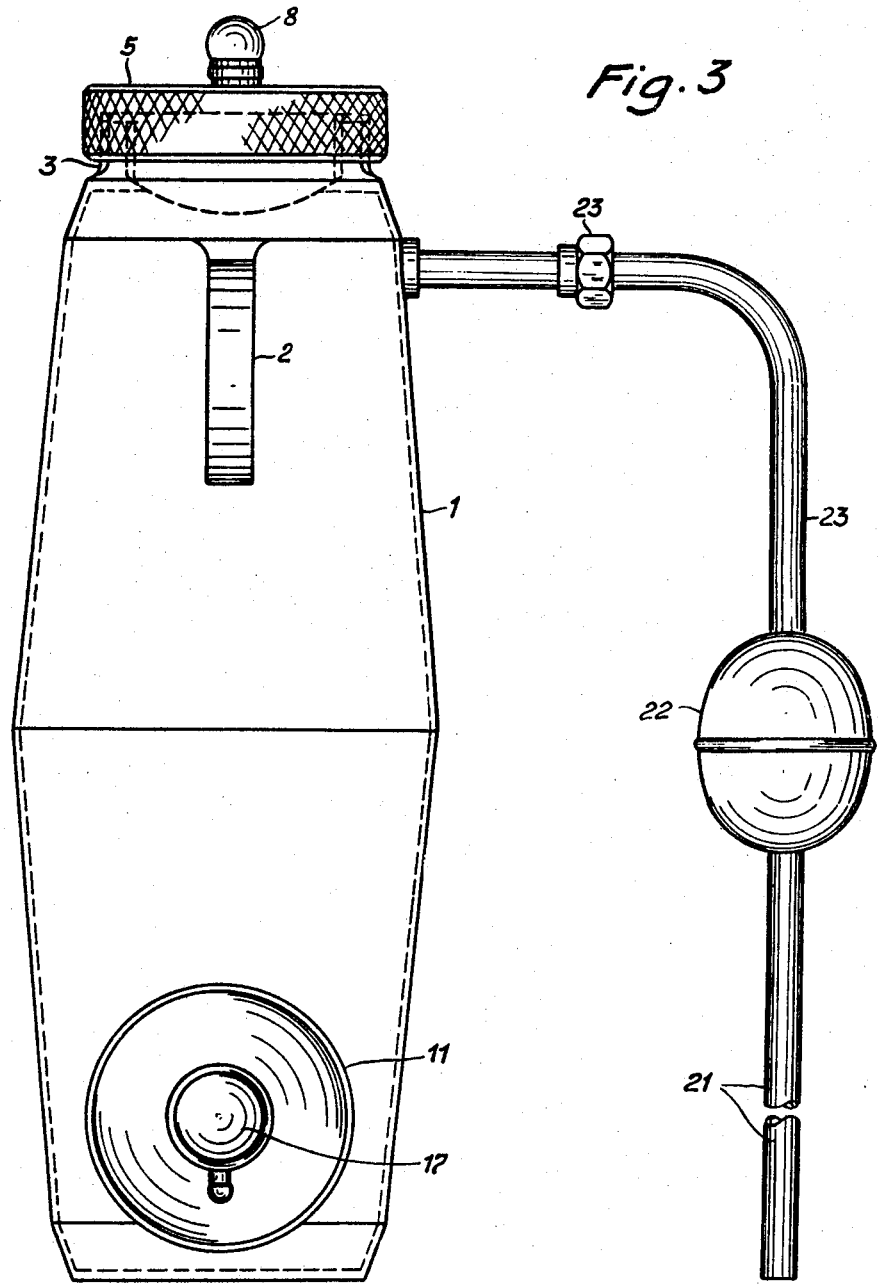

3,392,837
WATER-CONDITIONING UNIT
William A. Sanzenbacher, P.O. Box 341,
8022 Zurich, Switzerland
Filed Oct. 13, 1965, Ser. No. 495,457
1 Claim. (Cl. 210—282)

ABSTRACT OF THE DISCLOSURE

A water-conditioning and purifying device of a portable nature designed for the removal of relatively heavy foreign matter from water passing into the container and having separate means arranged adjacent the outlet of the container for the removal of finer foreign substances and for the ultimate purification of the water.

---

Figure 1:
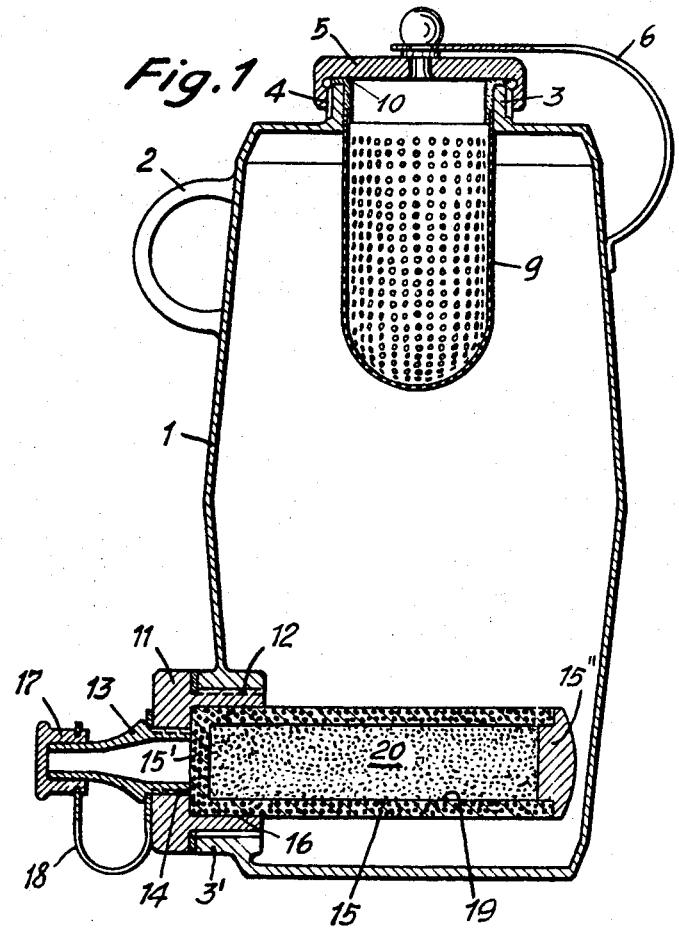

The present invention relates to a water-conditioning unit. Corresponding units known so far comprise a container provided with a prefilter, a filter candle of diatomaceous earth being positioned in a fine-grained pourable or shakable filtering and purifying material. The water to be treated first contacts with said material which consists of a special activated charcoal that is combined with silver and may contain certain additives. The water then reaches the filter candle under pressure and passes therethrough to run out in a conditioned state.

Water from lakes, ponds, brooks treated with the device described above, as well as rain and snow water conditioned thereby, is sufficiently treated but has a bluish glimmer or shimmer that is considered inconvenient by users.

The unit according to the present invention tends to improve not only the conditioning treatment of water to make it potable but also the appearance thereof, i.e., impart thereto a neutral hue that is identical to that of spring water. The present unit is distinguished by the fact that a granular, effective substance is contained in a hollow space of a solid filter cartridge made of diatomaceous earth, said hollow space having a much greater width than the wall thickness of said filter cartridge.

Figure 2:
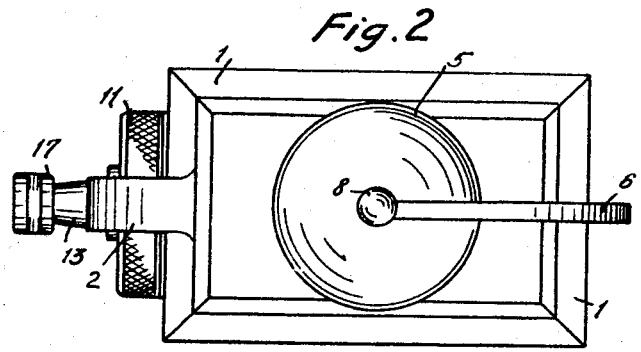

An embodiment of the invention is shown, by way of example, in the drawing in which:

FIG. 1 shows a section through a portable filtering unit,
FIG. 2 is a top view thereof, and
FIG. 3 is a side view of FIG. 1 in a larger scale.

A container 1 made of plastic or metal is provided with a handle 2, a filler neck 3 and an outlet neck 3′ immediately above the container bottom. On exterior threads 4 of filler neck 3 is screwed a closure nut 5 in a tightly closing relation, which is connected to container 1 by a flexible safety band 6. A coarse sieve 9 of about one millimeter mesh width, which for cleaning purposes is readily exchangeable, through a flanged-on fitting rim 10 bears on the mouth rim of filler neck 3 and through the tightened closure nut 5 is clamepd between the latter and the mouth rim. Said coarse sieve 9 serves to retain the coarse dirt particles and impurities when pouring water through filler neck 3.

In the interior threads of the outlet neck 3′ of container 1 is screwed an outlet nut 11 provided with exterior threads 12. Nut 11 is provided with a threaded bore 14 that is open towards the outside and receives an outlet neck 13. Nut 11 further comprises a bearing bore 16 that is open to the inside and receives a filter cartridge 15 made of diatomaceous earth. The filter cartridge 15 is thin-walled and comprises a wide hollow space 19 that is much thicker than the wall. Filter cartridge 15, upon being permeated by the water from outside to inside, is effective for fine-filtering and degermination by virtue of the multitude of microscopically fine flutes, grooves, recesses, channels and cavities where the bacteria get caught. On its end-side facing outlet neck 13, filter cartridge 15 is closed by the rigid end-wall 15′ and on the opposite end-side by a removable plug 15″. Outlet neck 13 on its mouth-portion carries a readily removable closure cap 17 that is secured against loss by a flexible safety band 18 to outlet neck 13. Hollow space 19 of filter cartridge 15 is filled with an active pulverous or fine-grained (grain size suitably less than 2 mm.) agent 20 that consists of active charcoal combined with silver and that acts as purifying medium, and with other additives acting on the water, such as softeners. The material 20 fills hollow space 19 not solidly but loosely so that it will be shaken upon jarring the container 1.

When using the unit described above, the dirty or odorous water is poured through filler neck 3. The filled-in water, after being pre-filtered through coarse sieve 9, reaches filter cartridge 15 and permeates same when outlet 13 is opened. The foreign particles and the bacteria in the water are retained by the filter cartridge 15. When the water then passes through the effective agent 20, purification of the water is attained. After having passed through the agent 20, the water passes through the end-wall 15′ of filter cartridge 15, the filtering being repeated. The treated water finally passes through outlet 13 to the outside and then is potable.

With normally fouled water, the quantity of agent 20 provided in cartridge 15 suffices for filtering approximately 100 liters of water. Filter cartridge 15 has to be cleaned from time to time in order to maintain the good filtering and degerminating effect. As soon as the treated water flows too slowly from neck 13, the agent 20 or, respectively, the cartridge 15 has to be replaced or renewed.

The water to be treated suitably is sucked up through a flexible line 21 by means of a pumping bulb 22 having two valves and delivered through a line 24 connectable through a union 23 to container 1.

After having charged cartridge 15 with material 20, the unit described is used as follows. The soiled and odorous water to be treated is brought into container 1 through filler neck 3 or suction line 21. The container 1 is lightly pressurized through bulb 22. Outlet neck 13 then is opened. The water in container 1 permeates the peripheral wall of filter cartridge 15 and thereby is fine-filtered and degerminated. The water then percolates into and through the material 20, and a purifying action takes place, as is known when water comes into contact with activated charcoal and the additives. The water thus treated then permeates the end-wall 15′ from the inside to the outside and thereby is again fine-filtered and degerminated.

The water flowing out of outlet neck 13 is in a conditioned state so that it may be used as potable water. The agent or material 20 may contain softening additives.

The device or unit described may be made not only of metal or plastic but also of a combination thereof. On the outlet neck 13 could be arranged of course, another suitable regulating means such as a rotary, tilting, sliding or similar shutting-off valve. The size of the unit is adapted to the purpose or use, and the water contents of the container are limited to one or more liters for personal use so that it may be added to one's personal use on journeys, trips, voyages and travels without requiring too much room.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claim.

Having thus described my invention, I claim as new and desire to secure by Letters Patent:

1. In a water-conditioning unit comprising in combination a portable water-container, there being a water filling opening at the upper end of the container, a coarse sieve having an annular flange at its upper end supported on the neck of the filling opening, a threaded cap closing the filling opening and holding the sieve in place, said container having an outlet opening adjacent its lower end, a solid filter cartridge having its discharge end facing said outlet opening and comprising diatomaceous earth for fine-filtering and degermination and a coarse-grained purifying material disposed in said filter cartridge consisting of a hollow space of said filter cartridge, said hollow space having a much greater width than the wall thickness of said filter cartridge, the hollow space of said filter cartridge being closable by a removable plug for refilling purposes, and a pumping balloon provided for raising the air pressure in the container, the treated and conditioned water dripping from the container through the pressrue by said pumping balloon.

References Cited

UNITED STATES PATENTS

| | | | |
|---|---|---|---|
| 529,471 | 11/1894 | Arendell | 210—266 |
| 2,372,340 | 3/1945 | Senyal | 210—314 X |
| 2,672,987 | 3/1954 | Hutchinson | 210—136 |
| 2,781,312 | 2/1957 | Klumb et al. | 210—282 X |
| 3,223,619 | 12/1965 | Calmon et al. | 210—282 X |
| 3,327,859 | 6/1967 | Pall | 210—282 X |

SAMIH N. ZAHARNA, *Primary Examiner.*